No. 795,077.  
Patented July 18, 1905.

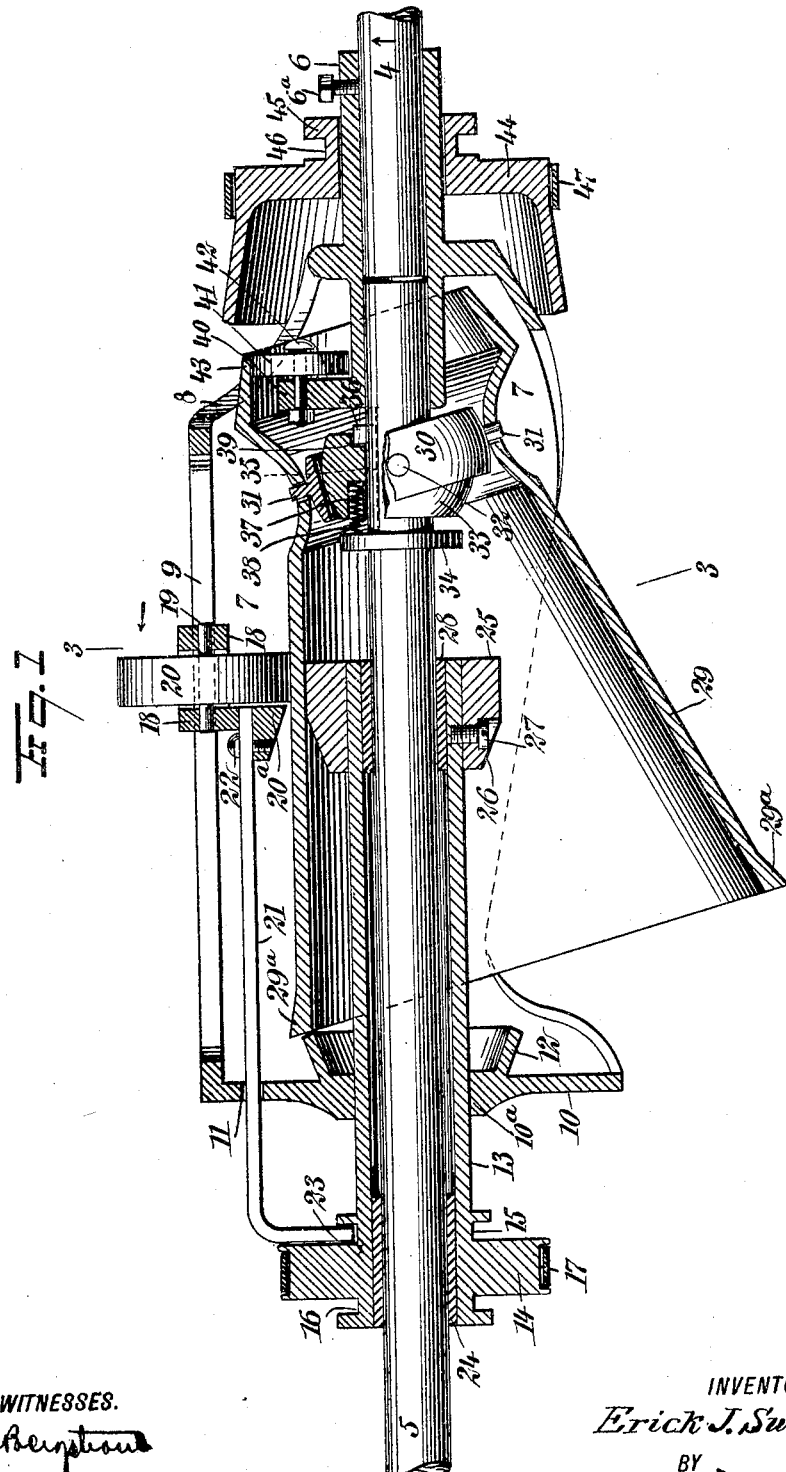

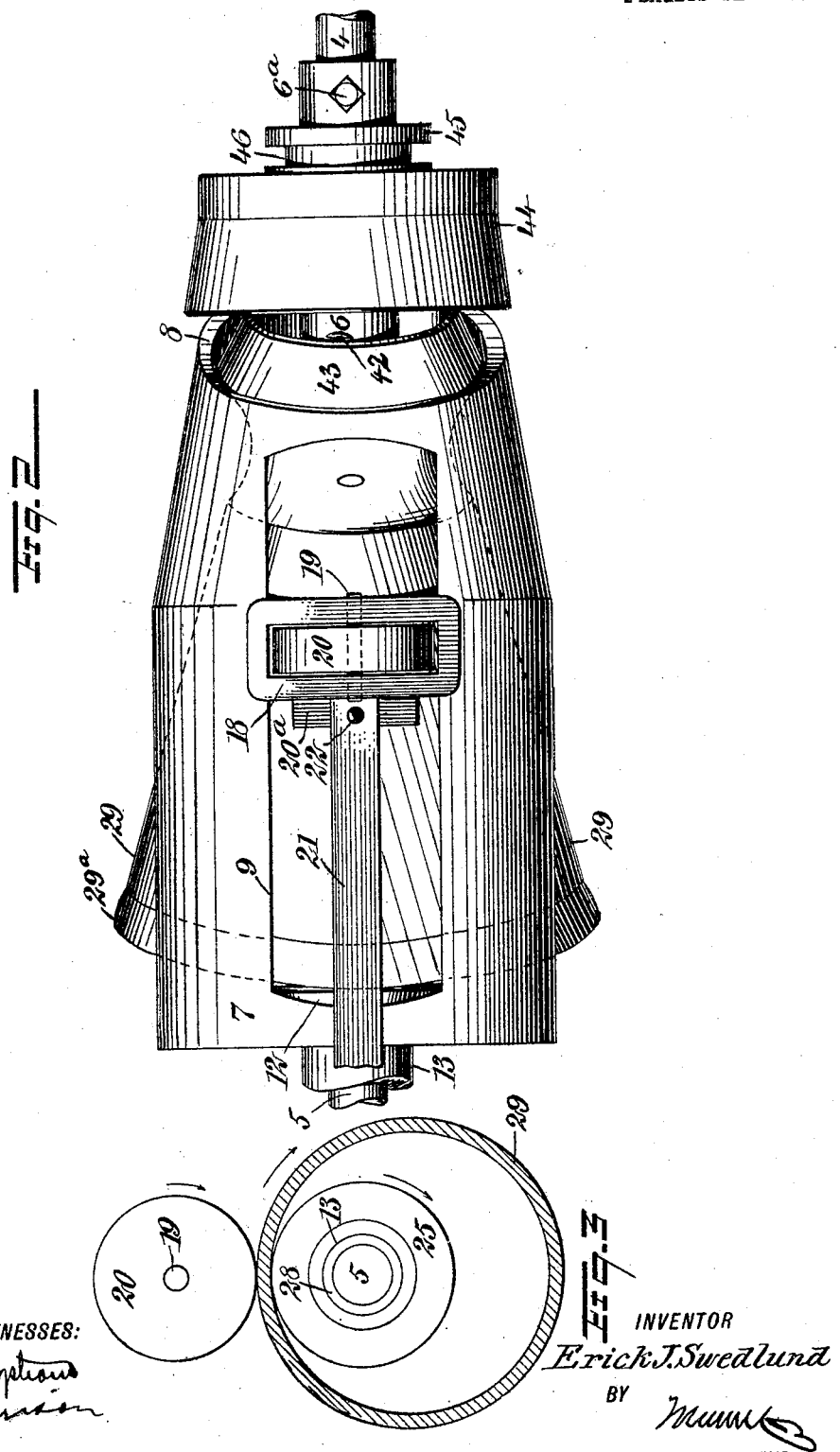

UNITED STATES PATENT OFFICE.

ERICK J. SWEDLUND, OF ATWATER, MINNESOTA.

POWER-TRANSMISSION GEAR.

SPECIFICATION forming part of Letters Patent No. 795,077, dated July 18, 1905.

Application filed April 10, 1905. Serial No. 254,753.

*To all whom it may concern:*

Be it known that I, ERICK J. SWEDLUND, a citizen of the United States, and a resident of Atwater, in the county of Kandiyohi and State of Minnesota, have invented a new and Improved Power-Transmission Gear, of which the following is a full, clear, and exact description.

My invention relates to power-transmission gears, my more particular object being to produce a type of gear in which a variable speed is attained by comparatively simple mechanism and which may be employed as a clutch or for the purpose of reversing the direction of rotation.

My invention is of peculiar value in connection with automobiles, motor-boats, motor-bicycles and the like, and among its advantages are noiseless operation, gradual change from low to high speed, elastic yet positive locking of the clutch mechanism, and positive motion of rotation as conferred from the driving shaft to the driven shaft.

Reference is to be had to the accompanying drawings, forming a part of this specification, in which similar characters of reference indicate corresponding parts in all the figures.

Figure 1 is a longitudinal vertical section through one form of gear embodying my invention, certain parts being broken away for the sake of clearness. Fig. 2 is a fragmentary plan view showing the same construction; and Fig. 3 is a section, partly diagrammatic, upon the line 3 3 of Fig. 1 looking in the direction of the arrow and showing the positive engagement of certain revoluble gear members.

The driving-shaft is shown at 4 and the driven shaft at 5. Mounted upon the driving-shaft 4 is a sleeve 6, held rigidly in position by means of a set-screw $6^a$, and consequently revoluble with the driving-shaft. A frame 7, having, preferably, the form of a hood, as indicated in Figs. 1 and 2, is integral with the sleeve $6^a$ and is provided with an aperture 8 and with a longitudinal slot 9. The frame 7 is also provided with a disk head 10, provided with an annular bearing $10^a$, the disk head 10 being provided with a passage-way 11 and with a clutch member 12, as indicated in Fig. 1. A sleeve 13 encircles the driven shaft 5 and is provided with a brake-drum 14, having annular grooves 15 16 upon each side thereof. The brake-drum 14 is fitted with a brake-band 17, whereby it may be held against rotation, so as to render the sleeve 13 stationary. A subframe 18 is fitted loosely into the slot 9 and is therefore slidably mounted upon the frame 7. Revolubly mounted within the subframe 18 is a pulley 20, supported upon a pin 19. This pulley is adapted to have two motions relatively to the frame 7, one being a bodily motion of translation in a direction coincident with the longitudinal direction of the slot 9, the other being a rotation upon the pin 19 as a center. Connected rigidly with the subframe 18 is a brake-shoe $20^a$, beveled as shown in Fig. 1. A rod 21 is secured, by means of a screw 22, rigidly upon the brake-shoe $20^a$ and is consequently rigid relatively to the subframe 18. This rod 21 passes through the aperture 11 and is provided with an end 23, which fits loosely into the annular groove 15, so as to maintain at all times a predetermined distance between the brake-drum 14 and the pulley 20. Encircled by the brake-drum 14 and connected rigidly with the sleeve 13 is a bearing-sleeve 24, which loosely engages the driven shaft 5.

Encircled by a buffer member 25 and concentric with the sleeve 13 is a bearing-sleeve 28, which loosely encircles the driven shaft 5 and is rigid relatively to the sleeve 13 and to the buffer member 25. A conoidal member 29 is provided with an annular swell $29^a$, which is adapted to be engaged by the brake-shoe $20^a$, these two parts fitting each other neatly when in engagement. The conoidal member 29 is journaled upon trunnions 31, carried by a ring 30, the latter being journaled by means of trunnions 32, carried by a ring 33, the rings 30 and 33 with their journals together constituting a universal joint positively connecting the conoidal member 29 and the driven shaft 25 together. A sliding key 35 is provided with a collar 34, connected rigidly thereto and loosely encircling the driven shaft 5. The key 35 terminates in a lug 36 and is encircled by the ring 33. A spring 37 is let into the ring 33 and bears against the collar 34, so that when the collar is forced to the right, according to the view shown in Fig. 1, the lug 36 is detached from the ring 33, which is provided with a notch 39, mating the lug 36. When, therefore, the collar 34 is moved so as to disengage the lug 36 from the notch 39, the ring 33, and consequently the conoidal member 29, is loose relatively to the driven shaft 5; but when the collar 34 assumes its normal position under pressure of the spring 38 the driven shaft 5 is connected positively with the conoidal member 29 by means of the universal joint above described.

The sleeve 6 is provided with a lug 40, carrying a pulley 41, which is revolubly mounted upon a stub-shaft 42. This pulley 41 has two motions, one being a rotation upon its own axis, the other being a bodily movement around the driven shaft 5 as a center. The conoidal member 29 is provided with a tapering portion 43 of annular conformity, which may be engaged by the inner surface of a hollow pulley 44. This pulley is provided with a collar 45 and with an annular groove 46 immediately adjacent to the collar and used for shifting the hollow pulley 44 in a lateral direction upon the sleeve 6. The hollow pulley is, in effect, a sort of gear member which engages the bearing-surface 43 through the aperture 8 of the frame 10. A brake-band 47 encircles the gear member 44 and may be employed to hold the same against rotation.

The operation of my device is as follows: Power being applied to the driving-shaft 4 in any desired manner, the sleeve 6, carrying the frame 7, begins to rotate. If now the brake-drum 14 be moved to the right, so as to force the buffer member 25 into engagement with the collar 34, the spring 37 is compressed, the lug 36 is removed from the notch 39, and the ring 33 is disconnected from the driven shaft 5 and is free to run idly thereupon. This stops all motion of the driven shaft. The brake-drum 14 being moved a little to the left—say into the position indicated in Fig. 1—the rod 21 causes the pulley 20 to travel in a lateral direction, this pulley and the buffer member 25 being always the same distance apart and separated by the thickness of the wall of the conoidal member 29. The brake-band 17 being now tightened so as to prevent any rotation of the buffer member 25 and the frame 7 being at all times free to rotate, motion is transmitted from the frame 7, through the universal joint, to the driven shaft 5, for the reason that the ring 33 is now locked rigidly upon the driven shaft by the action of the spring 38. The frame 7 necessarily rotates at the same speed as the driving-shaft 4, and consequently the subframe 18 and the rod 21 make this same number of revolutions. The pulley 20 rolls around upon the outside of the conoidal member 29, and as the buffer member 25 is stationary the conoidal member must have two motions—to wit, a gyroscopic motion around the buffer member 25 as a center and a rotary movement upon its own imaginary axis, due to the gradual rolling of its inner surface upon the buffer member 25. If now the brake-drum 14 be moved along the shaft 5 and tightened, the particular point chosen will determine the ratio of travel of the driven shaft relatively to the driving-shaft, the speed increasing as the buffer member 25 is placed nearest the larger end of the conoidal member or, according to the view shown in Fig. 1, as the buffer member 25 is moved toward the left. By adjusting the lateral position of the brake-band 17, therefore, the speed of the driven shaft can be varied at will within certain limits, assuming, of course, that the speed of the driving-shaft 4 is approximately constant. If the brake-drum 14 be moved a considerable distance to the left and the brake-band 17 left loose, the buffer member 25 stops in engagement with the annular surface $29^a$ of the conoidal member 29, the annular beveled portion 26, which serves as a clutch member, engaging the clutch member 12. This locks the conoidal member 29 and the clutch members 26 and 12 rigidly together, and at the same instant the brake-shoe $20^a$ tightly engages the exterior of the thick annular portion $29^a$ of the conoidal member. The relative movement as between the frame 7 and the driven shaft 5 is thus prevented, and consequently the driving-shaft 4 and the driven shaft 5 have effectively locked together as by means of a positive grip clutch. If now it be desired to obtain a reverse motion of the driven shaft 5 relatively to that of the driving-shaft 4, the buffer member 25 is moved any desired distance to the right, so that the clutch members 26 12 disengage each other and the brake-shoe $20^a$ clears the annular surface $29^a$ of the conoidal member 29. The brake-band 17 is now left loose, so that the buffer member 25 is free to turn idly according to its inclination. The pulley 20 is now free to roll idly, but positively, in relation to the conoidal member 29. The hollow pulley 44 is next moved laterally in the general direction of the driven shaft 5— that is, moved to the left according to the view shown in Fig. 1—so that its inner surface engages the bearing-surface 43 at the smaller end of the conoidal member 29. The brake-band 47 being now tightened, the bearing-surface 43 rolls around within the hollow pulley 44, being pressed positively against the same, one point at a time, by means of the pulley 41. This pulley has a planetary movement around the axis of the driving-shaft 4 and constantly forces some one portion of the periphery of the bearing-surface 43 against a corresponding portion of the hollow pulley 44. Since, however, the bearing-surface 43 is of a diameter smaller than that of the effective diameter or "pitch-line" of the hollow pulley 44, it follows that the bearing-surface 43 and all other parts of the conoidal member 29 must have a rotary movement upon the imaginary axis of the conoidal member 29. Owing to the fact that the conoidal member 29 is positively connected, by means of the universal joint, with the driven shaft 5, it necessarily follows that the shaft last mentioned must have a comparatively slow movement reverse of that of the driving-shaft 4. The action of the pulley 41 in pressing the annular bearing-surface 43 against the interior of the hollow pulley 44 is somewhat analogous to the action of the pulley 20 in pressing the body portion of the conoidal member 29 into engagement with the buffer member 25. In other words, the pulley 20 pressing a part of the conoidal member 29 against the stationary buffer member 25 at a time when the latter is held stationary and meanwhile revolving bodily around the axis of this buffer gives the driven shaft a movement in one direction, whereas the pulley 41 acting similarly against another portion of the conoidal member 29 and forcing it against the hollow pulley 44, serving as another buffer member, gives it a reverse motion, provided the buffer member 25 be loose relatively to the driven shaft 5.

It will be understood that I use the terms "shaft," "pulley," &c., in a broad sense, meaning revoluble members of any kind which may be substituted as equivalents for the parts mentioned. It will also be seen that my device is practically irreversible—that is, power cannot be transmitted from the driven shaft to the driving-shaft when the mechanism is in action. This feature is especially of value when the mechanism is used for power transmission in motor-cars, as when going down a hill the momentum of the vehicle will not be transmitted to the motor. Consequently the motor will not be forced to run faster than its normal speed. Also in going up a hill if the motor should stop the vehicle cannot run backward, as it will be locked by the gear mechanism until released or unlocked by means of the sliding key 36 disconnecting the driven shaft from the ring 33. Further, my device is of peculiar value as an irreversible steering-gear for motor-cars.

Having thus described my invention, I claim as new and desire to secure by Letters Patent—

1. The combination of a driven shaft, a hollow conoidal member encircling the same, a universal joint connecting said driven shaft and said hollow conoidal member together, a buffer member engaging said conoidal member internally, and a driving member engaging said hollow conoidal member externally and free to travel bodily around the same, thus causing said hollow conoidal member to gyrate.

2. The combination of a driven shaft, a hollow conoidal member encircling the same, a universal joint connecting said driven shaft and said hollow conoidal member positively together, a buffer member mounted loosely upon said driven shaft and encircled by said hollow conoidal member, said buffer member being provided with a substantially cylindrical portion to be engaged by said conoidal member, means for rendering said buffer member stationary, a pulley engaging the exterior of said hollow conoidal member, and means for causing said pulley to travel bodily around said hollow conoidal member.

3. The combination of a driven shaft, a hollow conoidal member encircling the same, a universal joint connecting said driven shaft and said hollow conoidal member together, a buffer member mounted loosely upon said driven shaft, means for moving said conoidal member into different relative positions along the axis of said driven shaft so as to engage portions of different diameters of said conoidal member, mechanism for rendering said buffer member stationary, and a driven member mounted externally of said hollow conoidal member and revoluble bodily around the same for maintaining said hollow conoidal member in engagement with said buffer member.

4. The combination of a driven shaft, a hollow conoidal member encircling the same, a universal joint connecting said driven shaft and said conoidal member together, a buffer member engaging said hollow conoidal member internally, a driving-shaft, a frame connected thereto and revoluble bodily therewith, and a gear member mounted upon said frame and movable bodily around said buffer member as a center, said gear member engaging the exterior of said hollow conoidal member.

5. The combination of a driven shaft, a hollow conoidal member encircling the same, mechanism connecting said driven shaft and said conoidal member together, a stationary buffer member engaging one surface of said hollow conoidal member, a revoluble gear member engaging the opposite surface of said hollow conoidal member, said buffer member and said revoluble gear member being separated by a distance representing the thickness of the wall of said hollow conoidal member, means for shifting said stationary buffer member and said revoluble gear member to different parts of said hollow conoidal member representing varying diameters thereof, and driving mechanism for causing said revoluble member to travel bodily around said driven shaft.

6. The combination of a driven shaft, a revoluble member connected therewith and free to gyrate, a gear member engaging said revoluble member and serving as a center around which the latter is free to gyrate, means for forcing said revoluble member into positive engagement with said gear member, and mechanism for actuating said revoluble member.

7. The combination of a driven shaft, a hollow conoidal member connected positively therewith, said conoidal member being free to rotate with said driven shaft and also free to gyrate around the same, a buffer member disposed within said conoidal member and engaging the same, the arrangement being such that said conoidal member rotates upon its own axis and gyrates around said buffer member, and a gear member externally engaging said conoidal member and free to revolve bodily around the same and to rotate upon its own axis while thus revolving.

8. The combination of a driven shaft, a hollow conoidal member connected thereto and revoluble therewith, a buffer member engaging said hollow conoidal member internally and provided with a portion serving as a clutch member, a frame mounted externally of said hollow conoidal member and revoluble bodily around said buffer member, said frame being provided with a clutch member mating said first-mentioned clutch member, a subframe mounted upon said frame and provided with a brake-shoe for engaging said conoidal member, means for sliding said subframe relatively to said frame, a pulley mounted upon said frame, and means for actuating said frame.

9. The combination of a driving-shaft, a lug supported thereby and adapted to move bodily therewith, a pulley mounted upon said lug and adapted to rotate upon its own axis and also to revolve bodily around said driving-shaft as a center, a gear member provided with a surface to be engaged by said pulley, said gear member being free to gyrate and also free to rotate upon its own axis, a pulley disposed adjacent to said gear member and adapted to be engaged thereby at a succession of points opposite to said pulley, means for rendering said pulley stationary, and a driven member connected with said gear member.

10. The combination of a driving-shaft, a pulley supported thereby and carried bodily around by said shaft, said pulley being also free to rotate upon its own axis independently of the axis of said driving-shaft, a hollow conoidal member engaged by said pulley, a stationary buffer member disposed adjacent to said hollow conoidal member and adapted to be engaged thereby when the latter is subjected to pressure by means of said pulley, thereby causing said hollow conoidal member to gyrate, and a driven member connected with said hollow conoidal member and actuated by movements thereof.

11. The combination of a driven shaft, a revoluble member of substantially conoidal form connected therewith and free to gyrate, the larger diameter of said conoidal member having the greater degree of movement, a gear member engaging said revoluble conoidal member and serving as a center around which the latter is free to gyrate, means for maintaining said conoidal member in positive functional engagement with said gear member, and mechanism for actuating said conoidal member.

In testimony whereof I have signed my name to this specification in the presence of two subscribing witnesses.

ERICK J. SWEDLUND.

Witnesses:
  WM. PETERSON,
  HOVER MICKELSON.